United States Patent
Chen et al.

(10) Patent No.: US 10,886,954 B2
(45) Date of Patent: Jan. 5, 2021

(54) FREQUENCY UP-CONVERSION DEVICE AND SIGNAL TRANSMISSION SYSTEM

(71) Applicant: WISTRON NEWEB CORPORATION, Hsinchu (TW)

(72) Inventors: Tzong-Jyh Chen, Hsinchu (TW); Wei-Ya Liao, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 78 days.

(21) Appl. No.: 16/458,423

(22) Filed: Jul. 1, 2019

(65) Prior Publication Data
US 2020/0067541 A1 Feb. 27, 2020

(30) Foreign Application Priority Data
Aug. 24, 2018 (TW) .............................. 107129623 A

(51) Int. Cl.
*H04B 1/00* (2006.01)
(52) U.S. Cl.
CPC ......... *H04B 1/0096* (2013.01); *H04B 1/0057* (2013.01)
(58) Field of Classification Search
CPC ............................. H04B 1/0096; H04B 1/0057
See application file for complete search history.

(56) References Cited

U.S. PATENT DOCUMENTS

| | | | | |
|---|---|---|---|---|
| 5,881,369 A | * | 3/1999 | Dean ...................... | H04B 1/005 455/266 |
| 2002/0193067 A1 | * | 12/2002 | Cowley ................ | H03H 11/362 455/3.02 |
| 2004/0245995 A1 | * | 12/2004 | Williams ............... | H04N 17/00 324/512 |
| 2008/0319689 A1 | * | 12/2008 | Williams ............... | H04N 17/00 702/59 |
| 2020/0067541 A1 | * | 2/2020 | Chen .................... | H04B 1/0057 |

\* cited by examiner

*Primary Examiner* — Benjamin H Elliott, IV
(74) *Attorney, Agent, or Firm* — McClure, Qualey & Rodack, LLP

(57) ABSTRACT

A frequency up-conversion device and a signal transmission system are provided. A frequency up-conversion device includes a first diplexer, a divider, a digital channel stacking circuit, an up-conversion mixer, and a second diplexer. The first diplexer divides a first signal into a second signal and a third signal. The digital channel stacking circuit transforms the second signal to a fourth signal. The up-conversion mixer mixes the fourth signal and an up-conversion oscillating signal to generate a fifth signal. The second diplexer receives the fifth signal and the third signal to generate a sixth signal for output.

12 Claims, 9 Drawing Sheets

FREQUENCY UP-CONVERSION DEVICE AND SIGNAL TRANSMISSION SYSTEM

CROSS-REFERENCE TO RELATED PATENT APPLICATION

This application claims the benefit of priority to Taiwan Patent Application No. 107129623, filed on Aug. 24, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a frequency up-conversion device and a signal transmission system, and more particularly to a frequency up-conversion device and a signal transmission system using a single mixer.

BACKGROUND OF THE DISCLOSURE

Although a plurality of frequency bands are used in radio communication, still a huge amount of the data are required to be transmitted through a limited number of frequency bands. In wireless communication, the data can be converted to the frequency band that is not busy by frequency adjustment. In the industry, the data is often adjusted to the frequency band of the satellite signal or the frequency band with higher frequency for transmission. However, in wired communication, since the data is transmitted by using communication cables over a high frequency band, the cost is greater compared with the wireless communication. In addition, in a frequency up-conversion process or a frequency down-conversion process of the signals, the signals of different frequencies are processed by their respective mixers, which not only results in high cost, but causes the signals between different frequencies to easily interfere with each other.

Therefore, it has become an important issue to provide a frequency up-conversion device and a signal transmission system that are cost-effective and have fewer mixers.

SUMMARY OF THE DISCLOSURE

In response to the above-referenced technical inadequacies, the present disclosure provides a frequency up-conversion device and a signal transmission system.

In one aspect, the present disclosure provides a frequency up-conversion device which is electrically connected to a first terminal of a communication cable for receiving a first signal. The first signal is transmitted in a first frequency band. The first frequency band includes a second frequency band and a third frequency band. The frequency up-conversion device includes a first diplexer, an up-conversion divider, a digital channel stacking circuit, an up-conversion mixer, and a second diplexer. The first diplexer includes an input terminal, a first output terminal and a second output terminal. The input terminal of the first diplexer receives the first signal, and divides the first signal into a second signal and a third signal. The second signal and the third signal are respectively transmitted through the first output terminal and the second output terminal. The second signal and the third signal are respectively transmitted through the second frequency band and the third frequency band. The up-conversion divider includes an input terminal, a first output terminal, and a second output terminal. The input terminal of the up-conversion divider is electrically connected to the second output terminal of the first diplexer for receiving the second signal. The digital channel stacking circuit is electrically connected to the second output terminal of the up-conversion divider. The digital channel stacking circuit transforms the second signal transmitted by the up-conversion divider into a fourth signal. The up-conversion mixer is electrically connected to the digital channel stacking circuit for mixing the fourth signal and an up-conversion oscillating signal to generate a fifth signal. The second diplexer is electrically connected to the first diplexer and the up-conversion mixer for respectively receiving the fifth signal and the third signal to generate a sixth signal. The first output terminal of the up-conversion divider outputs the second signal.

In one aspect, the present disclosure provides a signal transmission system electrically connected a terrestrial antenna and a satellite antenna. The signal transmission system includes a frequency down-conversion device, a frequency up-conversion device, and a communication cable. The frequency down-conversion device receives a terrestrial signal from the terrestrial antenna and a satellite signal from the satellite antenna. The frequency down-conversion device transforms the terrestrial signal and the satellite signal into a first signal transmitted in a frequency band. The first frequency band includes a second frequency band and a third frequency band. A frequency of the second frequency band is lower than a frequency of the third frequency band. The communication cable includes a first terminal and a second terminal. The first terminal of the communication cable is electrically connected to the frequency up-conversion device. The second terminal of the communication cable is electrically connected to the frequency down-conversion device. The communication cable receives the first signal transmitted by the frequency down-conversion and transmits the first signal to the frequency up-conversion device. The frequency up-conversion device includes a first digital channel stacking circuit and an up-conversion mixer. The first digital channel stacking circuit extracts a part of signals transmitted in the second frequency band and the up-conversion mixer transforms the part of the signals transmitted in the second of frequency band into a fifth signal. The fifth signal is transmitted in a fifth frequency band. A frequency of the fifth frequency band is higher than a frequency of the first frequency band and a frequency of the third frequency band.

According to above, the frequency up-conversion device of the present disclosure uses the digital channel stacking circuit and a single mixing circuit for transforming the signals of different frequencies into the predetermined frequency interval effectively and efficiently. The design cost of the circuit is reduced accordingly. In addition, transforming the signal of the high-frequency frequency band transformed into the low-frequency frequency band for transmission effectively reduces the cable cost of the wired transmission.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
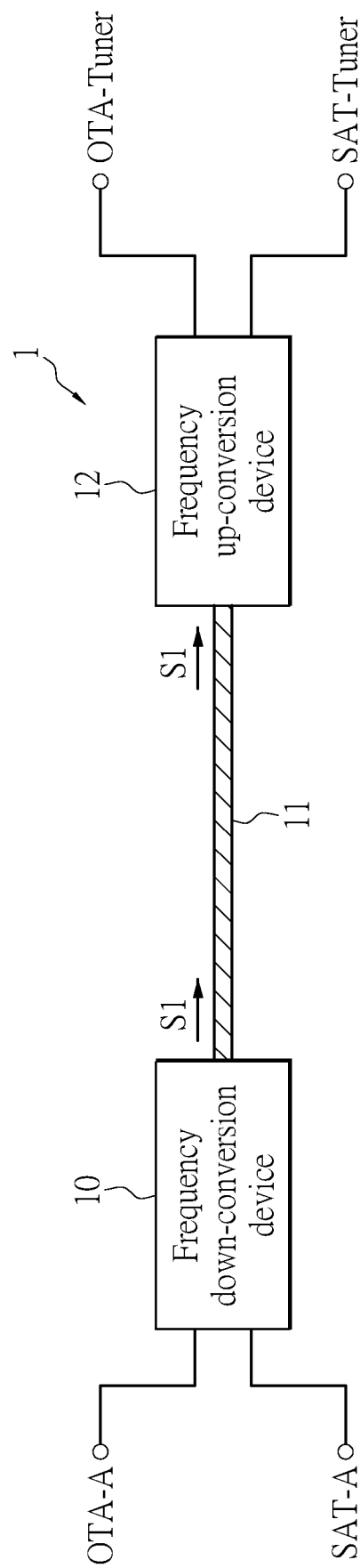
FIG. 1 is a function block diagram of a signal transmission system of an embodiment according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1, FIG. 1 is a function block diagram of a signal transmission system according to an embodiment of the present disclosure.

A signal transmission system 1 includes a frequency down-conversion device 10, a communication cable 11, and a frequency up-conversion device 12. The frequency down-conversion device 10 receives a terrestrial signal from a terrestrial antenna OTA-A and a satellite signal from a satellite antenna SAT-A. In the embodiment, the communication cable 11 is a coaxial cable. In other embodiments, the communication cable 11 can be other communication cables, which is not limited in the present disclosure.

The frequency down-conversion device 10 transforms the terrestrial signal and the satellite signal into a first signal S1 transmitted in a first frequency band. In the embodiment, the first frequency includes a second frequency band and a third frequency band. The second frequency band is between 70 MHz and 850 MHz. The third frequency band is between 950 MHz and 2150 MHz.

In the embodiment, the communication cable 11 includes a first terminal and a second terminal. The first terminal of the communication cable 11 is electrically connected to the frequency up-conversion device 11. The second terminal of the communication cable 11 is electrically connected to the frequency down-conversion device 10.

The communication cable 11 receives the first signal S1 transmitted by the frequency down-conversion device 10, and transmits the first signal S1 to the frequency up-conversion device 12. The frequency up-conversion device 12 respectively outputs the terrestrial signal and the satellite signal to a terrestrial tuner OTA-Tuner and a satellite tuner SAT-tuner. The transmission characteristics of the communication cable are optimized in the first frequency band that the first signal S1 is transmitted therein. In the embodiment, a part of the satellite signal is transmitted in a frequency band that is higher than an upper limit (2150 MHz) of the first frequency band (70 MHz-2150 MHz), namely, the frequency band between 2150 MHz and 3300 MHz.

Figure 2:
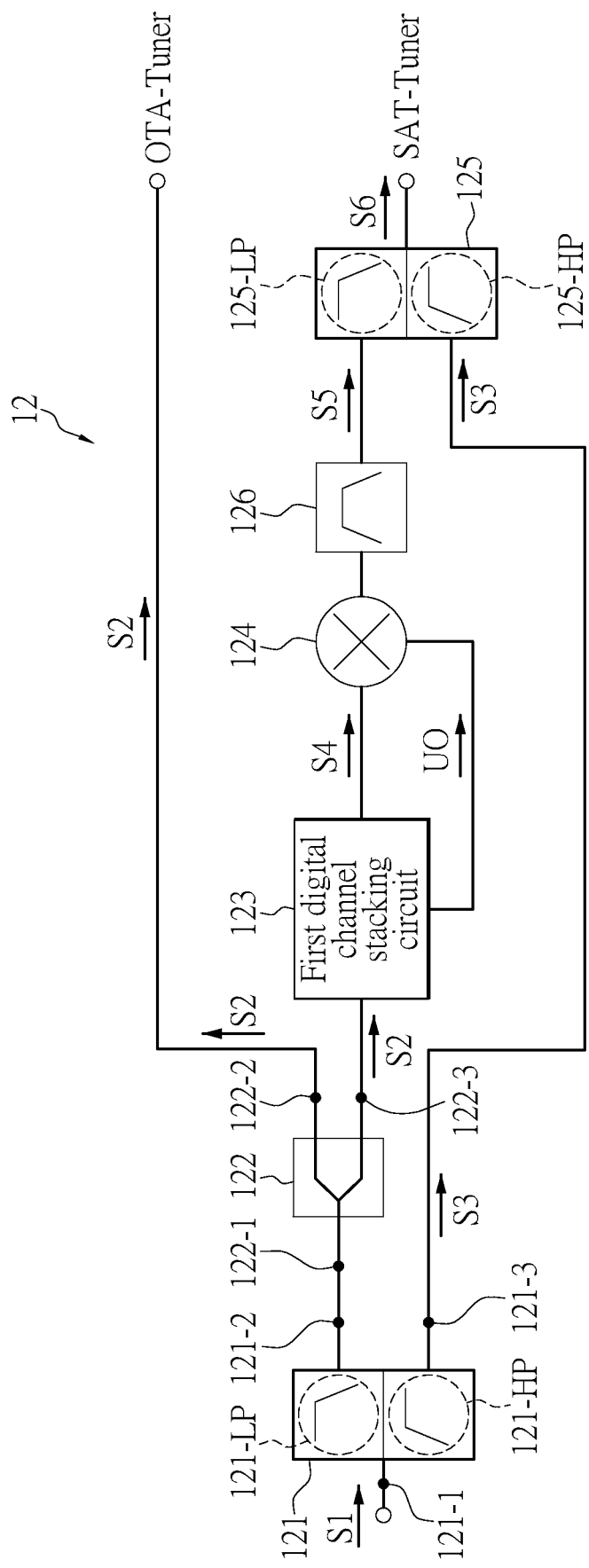
FIG. 2 is a function block diagram of a frequency up-conversion device of the embodiment according to the present disclosure.
Figure 3:
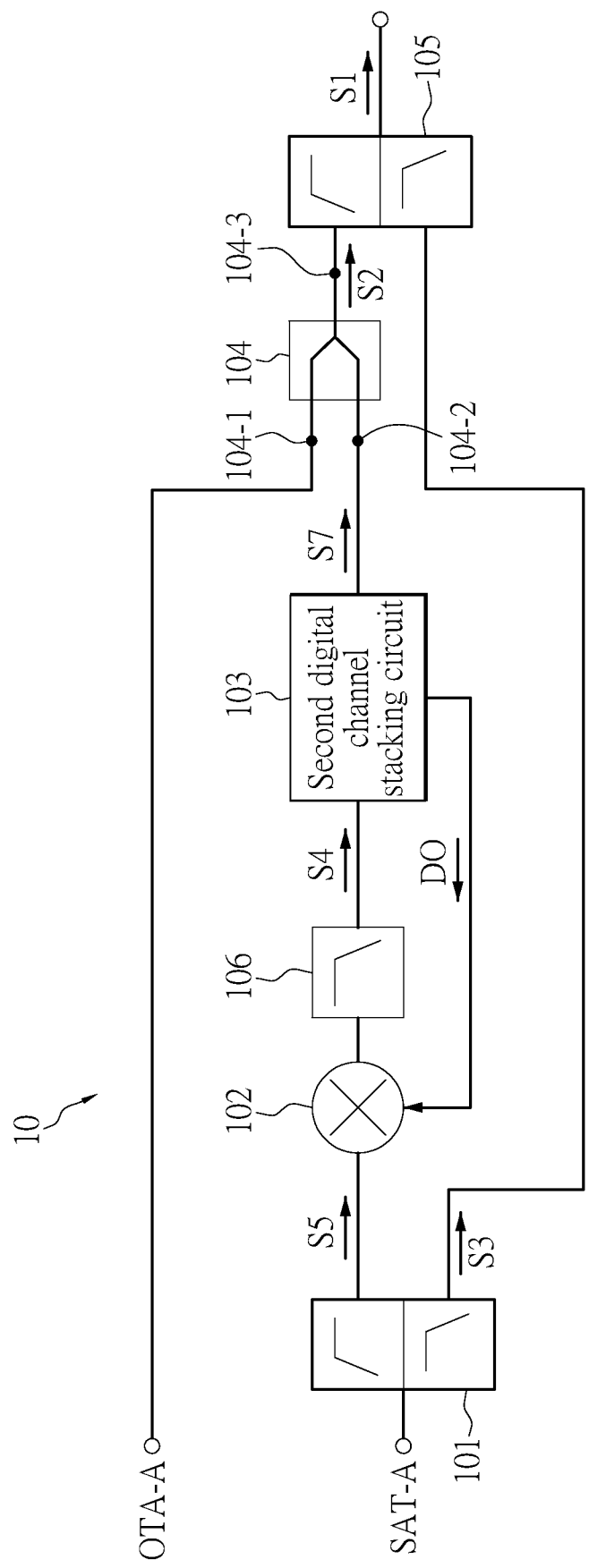
FIG. 3 is a function block diagram of a frequency down-conversion device of the embodiment according to the present disclosure.

Referring to FIG. 2 and FIG. 3, FIG. 2 is a function block diagram of a frequency up-conversion device according to the embodiment of the present disclosure, and FIG. 3 is a function block diagram of a frequency down-conversion device according to the embodiment of the present disclosure. The following paragraphs respectively describe the frequency up-conversion device 12 and the frequency down-conversion device 10.

Referring to FIG. 2, the frequency up-conversion device 12 is electrically connected to the first terminal of the communication cable 11, which is the right side of the communication cable 11 in FIG. 2. The frequency up-conversion device 12 receives the first signal S1 through the communication cable 11. The first signal S1 is transmitted in the first frequency band.

The first frequency band includes a second frequency band and a third frequency band. In the embodiment, the first frequency band is between 70 MHz and 2150 MHz. The second frequency band is between 70 MHz and 850 MHz. The third frequency band is between 950 MHz and 2150 MHz. In the embodiment, the first signal S1 includes a plurality of frequency interval signals. In other words, a plurality of signals are transmitted in different frequency intervals within the first frequency band.

The frequency up-conversion device 12 includes a first diplexer 121, an up-conversion divider 122, a first digital channel stacking (digital channel stacking switch, DCSS) 123, an up-conversion mixer 124, a second diplexer 125, and a band-pass filter 126.

The first diplexer 121 includes an input terminal 121-1, a first output terminal 121-2, and a second output terminal 121-3.

The input terminal 121-1 of the first diplexer 121 receives the first signal S1 and the first signal S1 is divided into a second signal S2 and a third signal S3. The second signal S2 and the third signal S3 are respectively transmitted through the first output terminal 121-2 and the second output terminal 121-3 of the first diplexer 121. The second signal S2 and the third signal S3 are respectively transmitted in the second frequency band and the third frequency band.

The up-conversion divider 122 includes an input terminal 122-1, a first output terminal 122-2, and a second output terminal 122-3. The input terminal 122-1 of the up-conversion divider 122 is electrically connected to the first output terminal 121-2 of the first diplexer 121 for receiving the second signal S2. The up-conversion divider 122 may be a power divider or a power splitter.

The first digital channel stacking circuit 123 is electrically connected to the second output terminal 122-3 of the up-conversion divider 122. The first digital channel stacking circuit 123 transforms the second signal S2 transmitted by the up-conversion divider 122 into a fourth signal S4.

The up-conversion mixer 124 is electrically connected to the first digital channel stacking circuit 123 for mixing the fourth signal S4 and an up-conversion oscillating signal UO to generate a fifth signal S5.

The second diplexer 125 is electrically connected to the first diplexer 121 and the up-conversion mixer 124 for receiving the fifth signal S5 and the third signal S3 to generate a sixth signal S6. In addition, the first output terminal 122-2 of the up-conversion divider 122 outputs the second signal S2. In the embodiment, the first output terminal 122-2 of the up-conversion divider 122 is electrically connected to a terrestrial tuner OTA-Tuner.

In the embodiment, the up-conversion oscillating signal UO is provided by the first digital channel stacking circuit 123 for the up-conversion mixer 124. In other embodiment, the up-conversion oscillating signal UO can be provided by other circuit. In the embodiment, the first digital channel stacking circuit 123 is an existing chipset. The first digital channel stacking circuit 123 includes an oscillating signal source, and being capable of providing the oscillating signal to the up-conversion mixer 124 for reducing the synchronous issue. In the embodiments, the up-conversion oscillating signal UO is 3550 MHz. In other embodiments, the up-conversion oscillating signal UO can be selected from a range between 3500 MHz and the 3600 MHz, which can be designed based on actual requirements, and is not limited in the present disclosure.

In the embodiment, the fourth signal S4 is transmitted through a fourth frequency band. The fifth signal S5 and the sixth signal S6 are respectively transmitted in a fifth frequency band and a sixth frequency band. In the embodiment, the fourth frequency band is between 250 MHz and 1250 MHz. The fourth frequency band is an operational frequency band of the first digital channel stacking circuit 123. Therefore, the first digital channel stacking circuit 123 converts the second signal S2 in the second frequency band to the operational frequency band for the up-conversion processing. In other embodiment, the fourth frequency band can be the same with the second frequency band, which is between 70 MHz and 850 MHz. Therefore, the process that the first digital channel stacking circuit 123 transforms the second signal S2 to fourth signal S4 can be simplified, and can be designed based on the actual requirements, and is not limited in the present disclosure. The fifth frequency band is between 2300 MHz and 3300 MHz. The sixth frequency band is between 950 MHz and 3300 MHz. According to the above, the frequency of the fifth frequency band is higher than that of the third frequency band, and the frequency of the third frequency band is higher that of the second frequency band.

The following paragraph describes the frequency transformation of the first digital channel stacking circuit 123 based on the above embodiment. In the embodiment, the up-conversion oscillating signal UO is 3550 MHz, and the fourth frequency band is between 250 MHz and 1250 MHz. In the embodiment, the frequency transformation is completed by mirroring the signals of the fourth frequency band. Firstly, the 3550 MHz is used for a zero point of the reflection process, and by subtracting the up-conversion oscillating signal UO (3550 MHz) from the upper limit 250 MHz and the lower limit 1250 MHz of the fourth frequency band, a frequency band from −3300 MHz to −2300 MHz is obtained. Then, the frequency band between −3300 MHz and −2300 MHz is processed through a reversed process, and the fifth frequency band between 2300 MHz and 3300 MHz is obtained. In other words, the signals of lower frequency in the fourth frequency band are transformed as the signals of higher frequency in the fifth frequency band. The signals of higher frequency in the fourth frequency band are transformed into the signals of lower frequency in the fifth frequency band. In other embodiments, the signal transformation is designed based on actual requirements, which is not limited in the present disclosure.

The sixth signal of the frequency up-conversion device 12 is between 950 MHz and 3300 MHz. However, the signals between 2300 MHz and 3300 MHz are signals in a new frequency band of the satellite signals. Since the frequency band between 2300 MHz and 3300 MHz is not busy, the wireless signals can be transmitted therein. However, if the signals of the frequency band between 2300 MHz and 3300 MHz are transmitted in a transmission line of the wired communication field, the communication cable with better characteristics should be used. Using better characteristics cable may increase the cost of the cable. According to the frequency up-conversion device 12, the signals transmitted in the fifth frequency band are transformed from the second signals S2 of the second frequency (70 MHz-850 MHz).

In addition, the first diplexer 121 includes a first high-pass filter 121-HP and a first low-pass filter 121-LP.

The first signal S1 is respectively transmitted through the first low-pass filter 121-LP and the first high-pass filter 121-HP. The first output terminal 121-2 of the first diplexer 121 outputs the second signal S2. The second output terminal 121-3 of the first diplexer 121 outputs a third signal S3.

The second diplexer 125 includes a second high-pass filter 125-HP and a second low-pass filter 125-LP. The second diplexer 125 combines the third signal S3 filtered by the second high-pass filter 125-HP and the fifth signal S5 filtered by the second low-pass filter 125-LP as the sixth signal S6. In the embodiment, the second diplexer 125 is further electrically connected to the satellite tuner SAT-Tuner. The second diplexer 125 transmits the sixth signal S6 to the satellite tuner SAT-Tuner. The second high-pass filter 125-HP and the second low-pass filter 125-LP of the second diplexer 125 are respectively used for filtering the fifth signal S5 and the third signal S3 once again to reduce the noises according to the transmission process. In this embodiment, the second high-pass filter 125-HP may filter out the frequency higher than 3300 MHz and the second low-pass filter 125-LP may filter out the frequency lower than 950 MHz, in which the second high-pass filter 125-HP and the second low-pass filter 125-LP act like a band-pass filter.

In the embodiment, the band-pass filter 126 is electrically connected between the up-conversion mixer 124 and the second diplexer 125 for more accurate the fifth signal S5.

Figure 4:
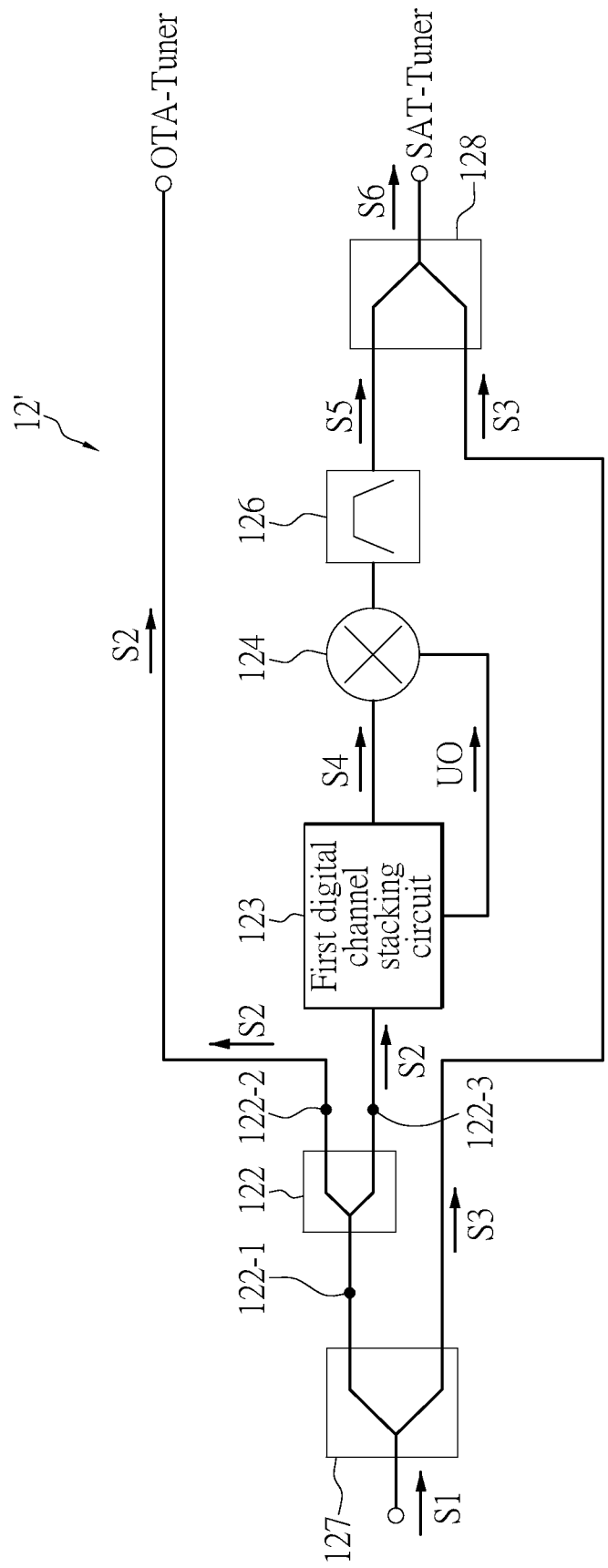
FIG. 4 is a function block diagram of a frequency up-conversion device of another embodiment according to the present disclosure.
Figure 5:
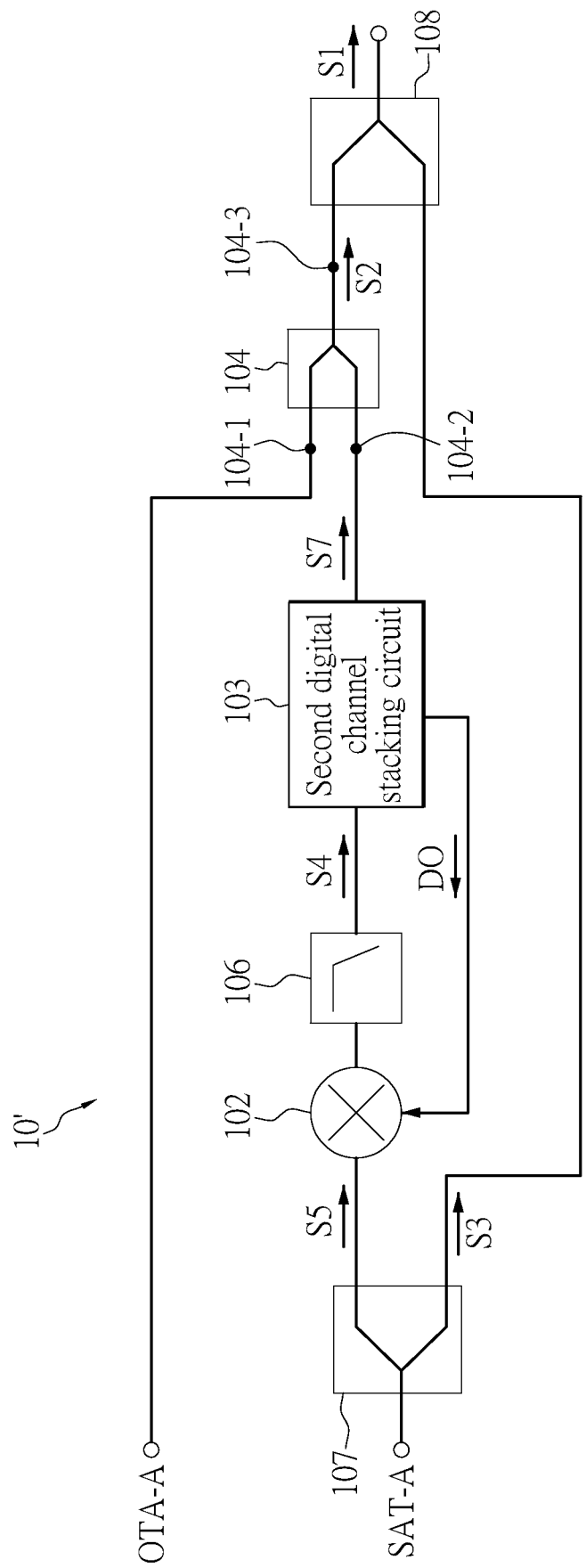
FIG. 5 is a function block diagram of a frequency down-conversion device of another embodiment according to the present disclosure.

Referring to FIG. 4 and FIG. 5, FIG. 4 is a function block diagram of a frequency up-conversion device according to another embodiment of the present disclosure, and FIG. 5 is a function block diagram of a frequency down-conversion device according to the another embodiment of the present disclosure.

The frequency up-conversion device 12' in FIG. 4 is similar to the frequency up-conversion device 12 in FIG. 2, while the major differences are that the first diplexer 121 and the second diplexer 125 are diplexer circuits, and the frequency up-conversion 12' uses the first dual-channel divider 127 and the second dual-channel divider 128. In the embodiment, the dual-channel divider is a dividing circuit, which can be a power divider or a power splitter having frequency filtering characteristics.

Similarly, the frequency down-conversion device 10' in FIG. 5 is similar to the frequency down-conversion device 10 in FIG. 3, while the major differences are that the third diplexer 107 and the fourth diplexer 105 are diplexer circuits, and the frequency down-conversion 10' uses the third dual-channel divider 107 and the fourth dual-channel divider 108. In the embodiment, the dual-channel divider is a dividing circuit, which can be a power divider or power splitter having frequency filtering characteristics.

Referring to FIG. 3, the frequency down-conversion device 10 includes a third diplexer 101, a down-conversion mixer 102, a second digital channel stacking circuit 103, a divider 104, and a fourth diplexer 105. In the embodiment, the frequency down-conversion device 10 is electrically connected to the terrestrial antenna OTA-A and the satellite antenna SAT-A.

The third diplexer 101 is used for receiving the satellite signal. The third diplexer 101 divides the satellite signal into the third signal S3 and the fifth signal S5, and the third signal S3 and fifth signal S5 are respectively transmitted through the third frequency band and the fifth frequency band. The third frequency band is between 950 MHz and 2150 MHz. The fifth frequency band is between 2300 MHz and 3300 MHz. The fifth frequency band is a new frequency band that the satellite signal transmitted therein.

The down-conversion mixer 102 is electrically connected to the third diplexer 101 for receiving the fifth signal S5. The down-conversion mixer 102 mixes a down-conversion oscillating signal DO with the fifth signal S5 for generating the fourth signal S4.

The second digital channel stacking circuit 103 of the frequency down-conversion device 10 is electrically connected to the down-conversion mixer 102 for receiving the fourth signals S4. The second digital channel stacking circuit 103 transforms the fourth signal S4 into the seventh signal S7. The seventh signal S7 and the fourth signals S4 are respectively transmitted by the seventh frequency band and the fourth frequency band. In the embodiment, the seventh frequency band is between 250 MHz and 850 MHz. The seventh frequency band is within in the second frequency band. The fourth frequency band is between 250 MHz and 1250 MHz. The seventh frequency band is the operational frequency band of the second digital channel stacking circuit 103. Therefore, the second digital channel stacking circuit 103 converts the fourth signal S4 of the fourth frequency band to the seventh frequency band for being combined with the terrestrial signal. In the embodiment, the second frequency band is between 70 MHz and 850 MHz. In other embodiments, the fourth frequency band can be the same as the seventh frequency band, and the advantages of which are the same as described in the above description. The range of the fourth frequency band can be designed based on the actual requirements, and is not limited in the present disclosure. In the embodiment, the frequency down-conversion device 10 further includes a third low-pass filter 106 defined between the down-conversion mixer 102 and the second digital channel stacking circuit 103 for filtering the low frequency noises of the fourth signal S4.

The divider 104 includes a first input terminal 104-1, a second input terminal 104-2, and an output terminal 104-3. The first input terminal 104-1 of the divider 104 receives the terrestrial signal. The second input terminal 104-2 of the divider 104 is electrically connected to the second digital channel stacking circuit 103 for receiving the seventh signal S7. The divider 104 combines the terrestrial signal and the second signal S2 to generate another second signal S2. In the embodiment, the terrestrial signal is transmitted in the frequency range between 70 MHz and 850 MHz, and the seventh frequency band is between 250 MHz and 850 MHz. The second diplexer 104 is capable of combining the above two signals as another second signal S2 transmitted in the second frequency band.

The fourth diplexer 105 is electrically connected to the divider 104 and the third diplexer 101 for receiving the second signal S2 and the third signal S3. The fourth diplexer 105 combines the second signal S2 and the third signal S3 to generate the first signal S1. In the embodiment, the frequency range of the first signal S1 is between 70 MHz and 2150 MHz, which includes the terrestrial signal and the satellite signal. The fourth diplexer 105 transmits the first signal S1 to the frequency up-conversion device 12 through the communication cable 11. In the embodiment, the first signal S1, the second signal S2, and the third signal S3 are respectively transmitted through the first frequency band, the second frequency band, and the third frequency band. Please note that the fourth diplexer 105 includes a high-pass filter and a low-pass filter which constitute a band-pass filter for providing the first signal S1 being between 70 MHz and 2150 MHz with lower noise.

Figure 6A:
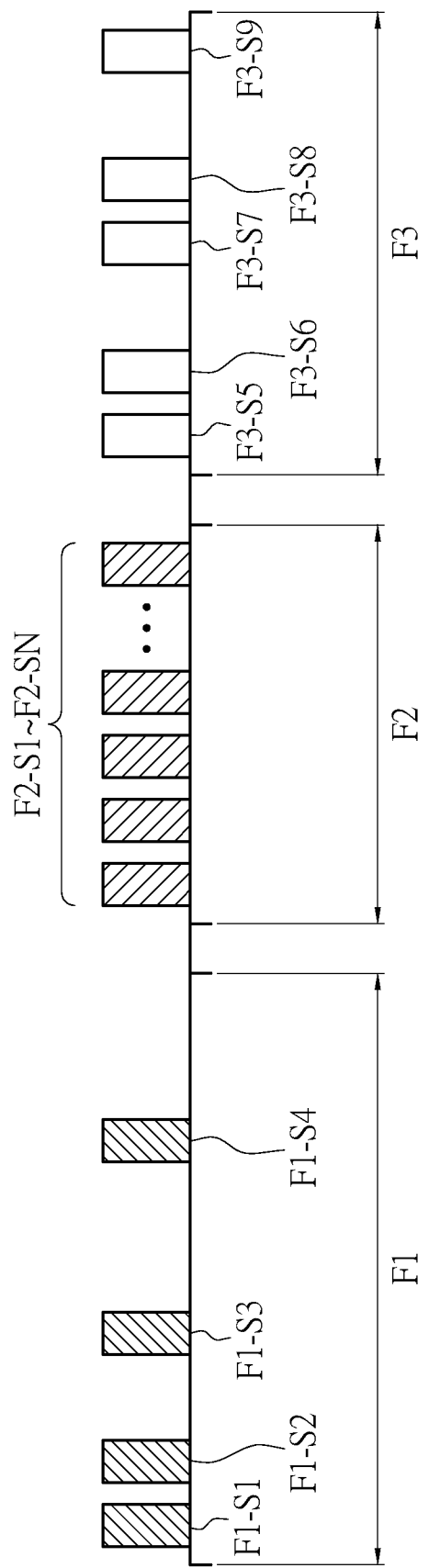
FIG. 6A is a diagram showing signal and frequency distribution before conversion of a digital channel stacking circuit according to the embodiment of the present disclosure.
Figure 6B:
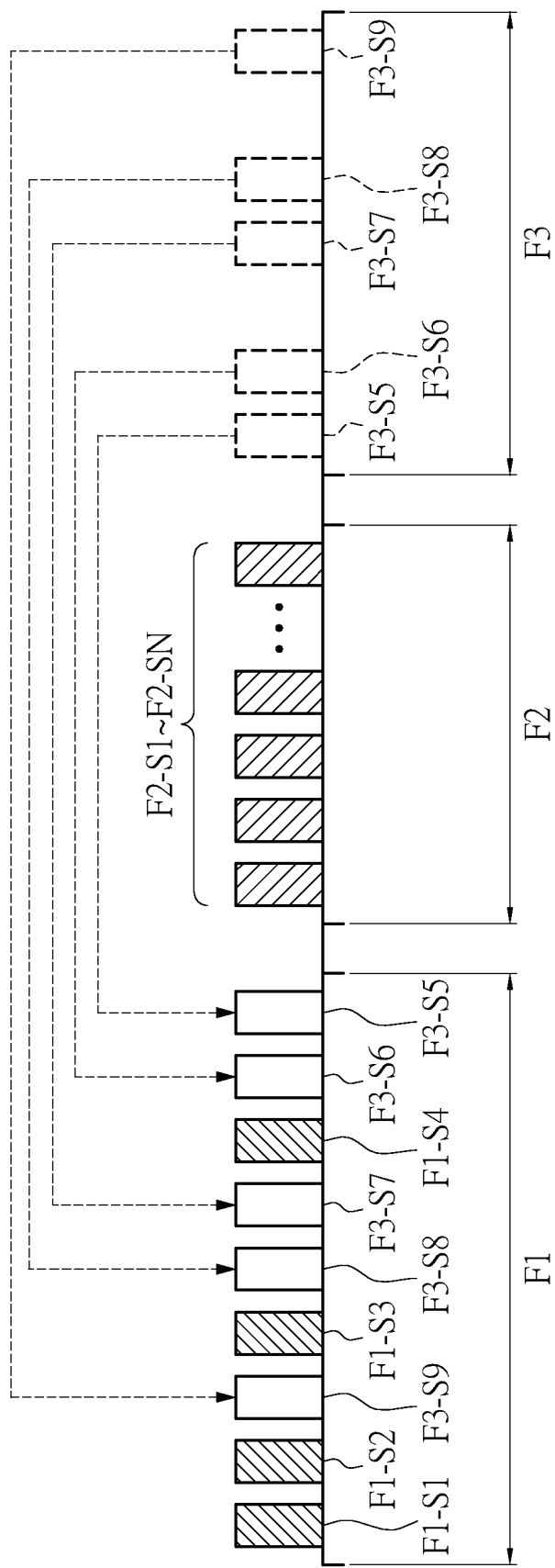
FIG. 6B is a schematic diagram showing that high frequency signals are transformed into the low-frequency frequency band by the digital channel stacking circuit according to the embodiment of the present disclosure.
Figure 6C:
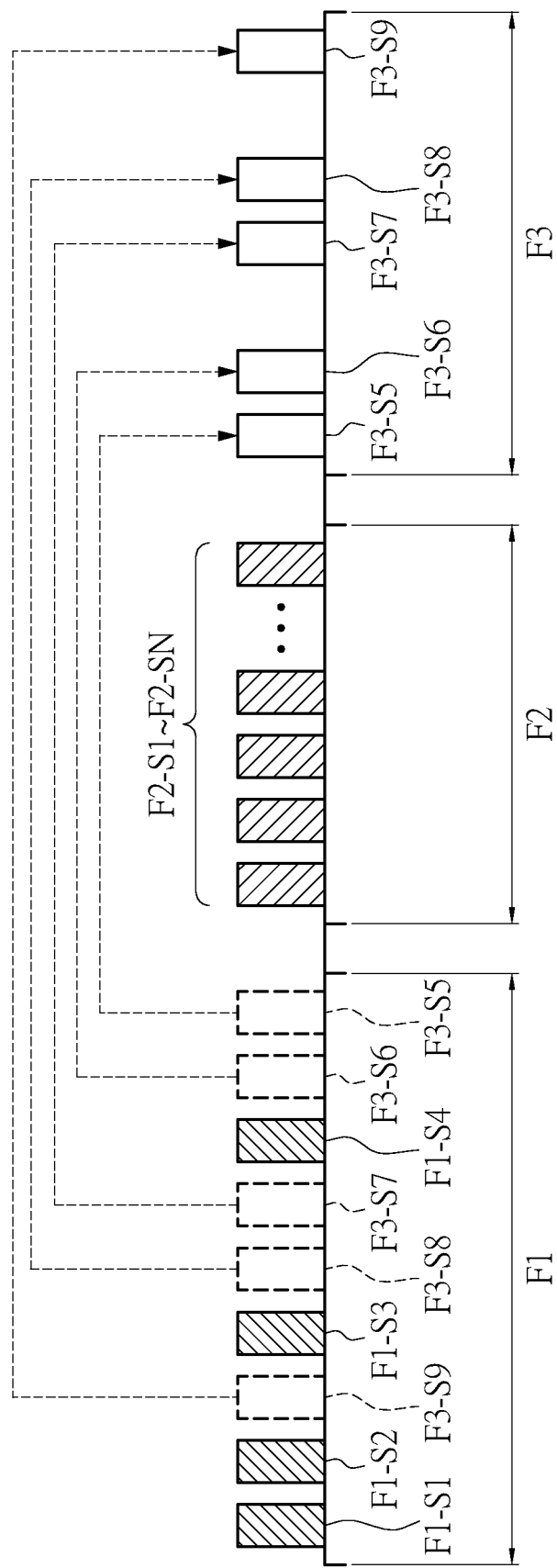
FIG. 6C is a schematic diagram showing stacked high frequency signals extracted from low frequency signals by the digital channel stacking circuit according to the embodiment of the present disclosure.

Referring to FIG. 6A, FIG. 6B, and FIG. 6C, FIG. 6A is a diagram showing signal and frequency distribution before conversion of a digital channel stacking circuit according to the embodiment of the present disclosure; FIG. 6B is a schematic diagram showing that high frequency signals are transformed in the low-frequency frequency band by the digital channel stacking circuit according to the embodiment of the present disclosure; FIG. 6C is a schematic diagram showing stacked high frequency signals extracted from the low frequency signals by the digital channel stacking circuit according to the embodiment of the present disclosure.

The operations of the first digital channel stacking circuit 123 and the second digital channel stacking circuit 103 are described as follows. As shown in FIG. 6A, there are a plurality of frequency intervals, including a first frequency interval F1, a second frequency interval F2, and a third frequency interval F3. A plurality of signals are arranged in each of the frequency intervals for being transmitted in different frequencies.

In the embodiment, a first frequency signal F1-S1, a second frequency signal F1-S2, a third frequency signal F1-S3, and a fourth frequency signal F1-S4 are transmitted in the first frequency interval F1.

The second frequency interval F2 includes a plurality of frequency signals F2-S1 to F2-SN. The third frequency interval F3 having a higher frequency includes a fifth frequency signal F3-S5, a sixth frequency signal F3-S6, a seventh frequency signal F3-S7, and an eighth frequency signal F3-S8, and a ninth frequency signal F3-S9.

As shown in FIG. 6B, the frequency signals of the third frequency interval F3 are respectively put in an unused frequency interval of the first frequency interval F1.

As shown in FIG. 6C, the first digital channel stacking circuit 123 and the second digital channel stacking circuit 103 can extract the signals defined in the unused frequency interval of the first frequency interval F1, and re-arrange them in the third frequency interval F3.

The rearrangement can be carried out by the first digital channel stacking circuit 123 and the second digital channel stacking circuit 103 through a frequency table. In the embodiment, the frequency up-conversion device 12 and the frequency down-conversion device 10 have the same frequency table. Therefore, in the operations of the frequency up-conversion device 12, when the second signal S2 is transmitted to the first digital channel stacking circuit 123, the first digital channel stacking circuit 123 can convert the signals F3-S5 to F3-S9 of the first frequency interval F1 to the original third frequency interval F3. Since the frequency of different frequency intervals has usage specifications and requirements, the unused frequency intervals of the different frequency band can be clearly known. Therefore, the first digital channel stacking circuit 123 and the second digital channel stacking circuit 103 can use the frequency table to transform the frequencies of the signals. In addition, in the embodiment, the first digital channel stacking circuit 123 and the second digital channel stacking circuit 103 can process at least 16 frequencies.

Figure 7:
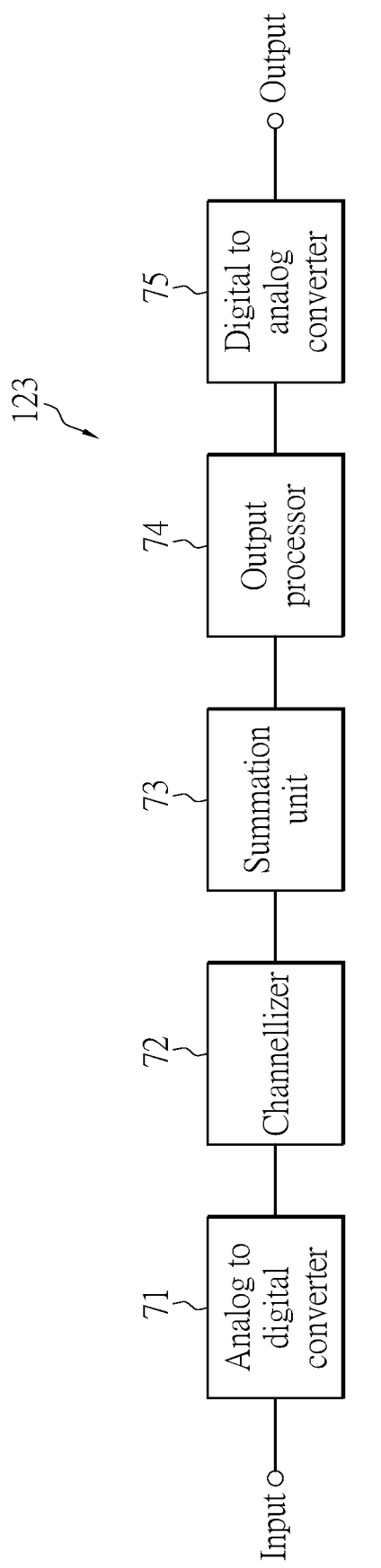
FIG. 7 is a function block diagram of a first digital channel stacking circuit according to the embodiment of the present disclosure.

Referring to FIG. 7, FIG. 7 is a function block diagram of a first digital channel stacking circuit according to the embodiment of the present disclosure.

In the embodiment, the structures and the functions of the first digital channel stacking circuit 123 and the second digital channel stacking circuit 103 are as shown in FIG. 7. The first digital channel stacking circuit 123 is taken as an example in the following description, where the description of the second digital channel stacking circuit 103 is omitted.

The first digital channel stacking circuit 123 includes an analog to digital converter 71, a channellizer 72, a summation unit 73, an output processor 74, and a digital to analog converter 75.

The analog to digital converter 71 is electrically connected to the channellizer 72. The channellizer 72 is electrically connected to the summation unit 73. The summation unit 73 is electrically connected to the output processor 74. The output processor 74 is electrically connected to the digital to analog converter 75.

In the embodiment, the input signals are transformed by the analog to digital converter 71 to the digital frequency signals. The channellizer 72 processes the frequency modulation and frequency arrangement of the digital frequency signals for transforming channels. Then the summation unit 73 is configured to summate those signals. That is, those signals of different channels are summated and arranged. After channel transformation and signal summation, the digital signals are processed by the output processor 74.

Finally, the digital to analog converter 75 transforms those digital signals to the analog signals in the predetermined frequency band for output.

According to the above, the frequency up-conversion device uses the digital channel stacking circuit and the single mixing circuit for converting the signals of different frequencies into the predetermined frequency interval effectively and efficiently. The design cost of the circuit is reduced accordingly. In addition, the conversion of the signal from the high-frequency frequency band to the low-frequency frequency band for transmitting effectively reduces the cable cost of the wired transmission and saving wiring new and better characteristics cable efforts.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A frequency up-conversion device, electrically connected to a first terminal of a communication cable for receiving a first signal, the first signal transmitted in a first frequency band, the first frequency band including a second frequency band and a third frequency band, the frequency up-conversion device comprising:
   a first diplexer, including an input terminal, a first output terminal and a second output terminal, wherein the input terminal of the first diplexer receives the first signal, and wherein the first diplexer divides the first signal into a second signal and a third signal which are respectively transmitted via the first output terminal through the second frequency band and the second output terminal through the third frequency band;
   a divider including an input terminal, a first output terminal, and a second output terminal, the input terminal of the divider electrically connected to the second output terminal of the first diplexer for receiving the second signal;
   a digital channel stacking circuit, electrically connected to the second output terminal of the divider, the digital channel stacking circuit transforming the second signal transmitted by the divider into a fourth signal;
   an up-conversion mixer, electrically connected to the digital channel stacking circuit for mixing the fourth signal and an up-conversion oscillating signal to generate a fifth signal; and
   a second diplexer, electrically connected to the first diplexer and the up-conversion mixer for receiving the fifth signal and the third signal to generate a sixth signal;
   wherein the first output terminal of the divider outputs the second signal.

2. The frequency up-conversion device of claim 1, wherein the digital channel stacking circuit provides the up-conversion oscillating signal to the up-conversion mixer.

3. The frequency up-conversion device of claim 1, wherein the first diplexer includes a first low-pass filter and a first high-pass filter, the first signal is transmitted through the first low-pass filter and the first high-pass filter for respectively generating the second signal and the third signal, the first output terminal of the first diplexer outputs the second signal, and the second output terminal of the first diplexer outputs the third signal.

4. The frequency up-conversion device of claim 1, wherein the second diplexer includes a second high-pass filter and a second low-pass filter, the second diplexer combines the third signal transmitted through the second high-pass filter and the fifth signal transmitted through the second low-pass filter to generate the sixth signal.

5. The frequency up-conversion device of claim 1, further comprising a band-pass filter electrically connected between the up-conversion mixer and the second diplexer.

6. The frequency up-conversion device of claim 1, wherein the fifth signal is transmitted in a fifth frequency band, a frequency of the fifth frequency band is higher than a frequency of the third frequency band, the frequency of the third frequency band is higher than a frequency of the second frequency band.

7. The frequency up-conversion device of claim 1, wherein the fourth signal is transmitted in a fourth frequency band, and the fourth frequency band is the same as the second frequency band.

8. The frequency up-conversion device of claim 1, wherein the first diplexer and the second diplexer are dual-channel divider.

9. A signal transmission system, electrically connected a terrestrial antenna and a satellite antenna, the signal transmission system comprising:
 a frequency down-conversion device receiving a terrestrial signal from the terrestrial antenna and a satellite signal from the satellite antenna, wherein the frequency down-conversion device transforms the terrestrial signal and the satellite signal into a first signal transmitted in a first frequency band, wherein the first frequency band includes a second frequency band and a third frequency band, and wherein a frequency of the second frequency band is lower than a frequency of the third frequency band;
 a frequency down-conversion device; and
 a communication cable, including a first terminal and a second terminal, the first terminal of the communication cable electrically connected to the frequency down-conversion device, the second terminal of the communication cable electrically connected to the frequency up-conversion device, wherein the communication cable receives the first signal transmitted by the frequency down-conversion and transmits the first signal to the frequency up-conversion device;
 wherein the frequency up-conversion device includes a first digital channel stacking circuit and an up-conversion mixer, wherein the first digital channel stacking circuit extracts a part of signals transmitted in the second frequency band and the up-conversion mixer transforms the part of the signals transmitted in the second frequency band into a fifth signal, wherein the fifth signal is transmitted in a fifth frequency band, and wherein a frequency of the fifth frequency band is higher than a frequency of the first frequency band and a frequency of the third frequency band.

10. The signal transmission system of claim 9, wherein the frequency up-conversion device including:
 a first diplexer, including an input terminal, a first output terminal and a second output terminal, wherein the input terminal of the first diplexer receives the first signal, wherein the first diplexer divides the first signal into a second signal and a third signal which are respectively transmitted via the first output terminal through the second frequency band and the second output terminal through the third frequency band;
 an up-conversion divider including an input terminal, a first output terminal, and a second output terminal, the input terminal of the up-conversion divider electrically connected to the second output terminal of the first diplexer for receiving the second signal, wherein the first digital channel stacking circuit is electrically connected to the second output terminal of the up-conversion divider, wherein the first digital channel stacking circuit transforms the second signal transmitted by the up-conversion divider into a fourth signal, and wherein the up-conversion mixer is electrically connected to the first digital channel stacking circuit for mixing the fourth signal and an up-conversion oscillating signal to generate the fifth signal; and
 a second diplexer, electrically connected to the first diplexer and the up-conversion mixer for respectively receiving the fifth signal and the third signal to generate a sixth signal;
 wherein the first output terminal of the up-conversion divider outputs the second signal.

11. The signal transmission system of claim 10, wherein the frequency down-conversion device including:
 a third diplexer, receiving the satellite signal, the third diplexer dividing the satellite signal into the third signal and the fifth signal for transmitting;
 a down-conversion mixer, electrically connected to the third diplexer for receiving the fifth signal, the down-conversion mixer using a down-conversion oscillating signal to mix the fifth signal for generating the fourth signal;
 a second digital channel stacking circuit, electrically connected to the down-conversion mixer for receiving the fourth signal and transforming the fourth signal into a seventh signal;
 a divider, including a first input terminal, a second input terminal, and an output terminal, the first input terminal of the divider receiving the terrestrial signal, the second input terminal of the divider is electrically connected to the second digital channel stacking circuit for receiving the seventh signal, the divider combining the terrestrial signal and the seventh signal to generate the second signal; and
 a fourth diplexer, electrically connected to the divider and the third diplexer for receiving the second signal and the third signal, the fourth diplexer combining the second signal and the third signal to generate the first signal.

12. The signal transmission system of claim 11, wherein the first digital channel stacking circuit and the second digital channel stacking circuit respectively include a frequency table.

* * * * *

UNITED STATES PATENT AND TRADEMARK OFFICE
CERTIFICATE OF CORRECTION

PATENT NO. : 10,886,954 B2
APPLICATION NO. : 16/458423
DATED : January 5, 2021
INVENTOR(S) : Chen et al.

It is certified that error appears in the above-identified patent and that said Letters Patent is hereby corrected as shown below:

In the Specification

1. In Column 7, Line 32, immediately following "divider" please delete "107" and insert therefor --101--.

2. In Column 8, Line 25, please delete "second signal S2" and insert therefor --seventh signal S7--.

3. In Column 8, Line 29, please delete "second duplexer" and insert therefor --divider--.

In the Claims

4. In Column 10, Line 45 (in Claim 1), please delete "second" and insert therefor --first--.

Signed and Sealed this
First Day of October, 2024

Katherine Kelly Vidal
*Director of the United States Patent and Trademark Office*